4 Sheets—Sheet 3.

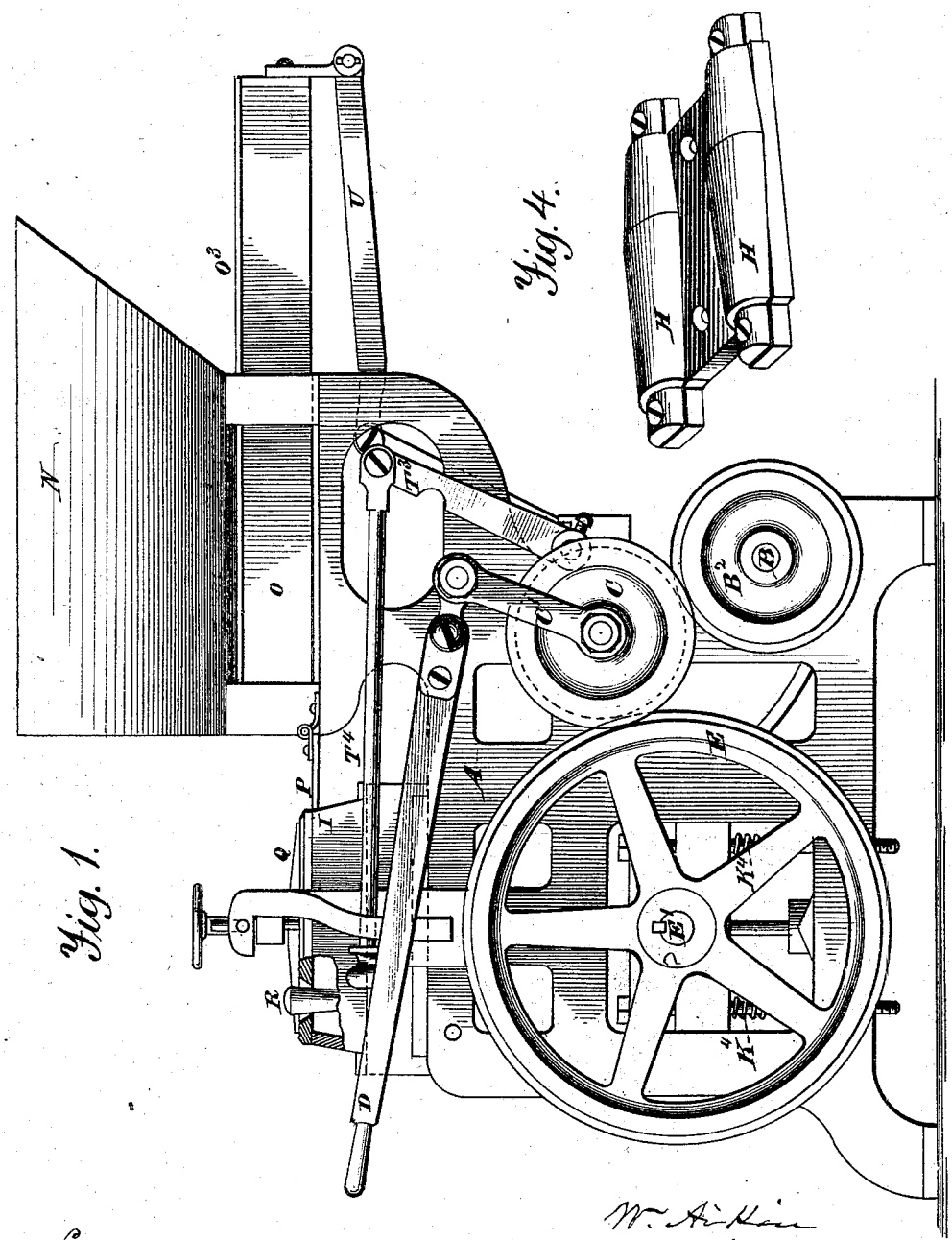

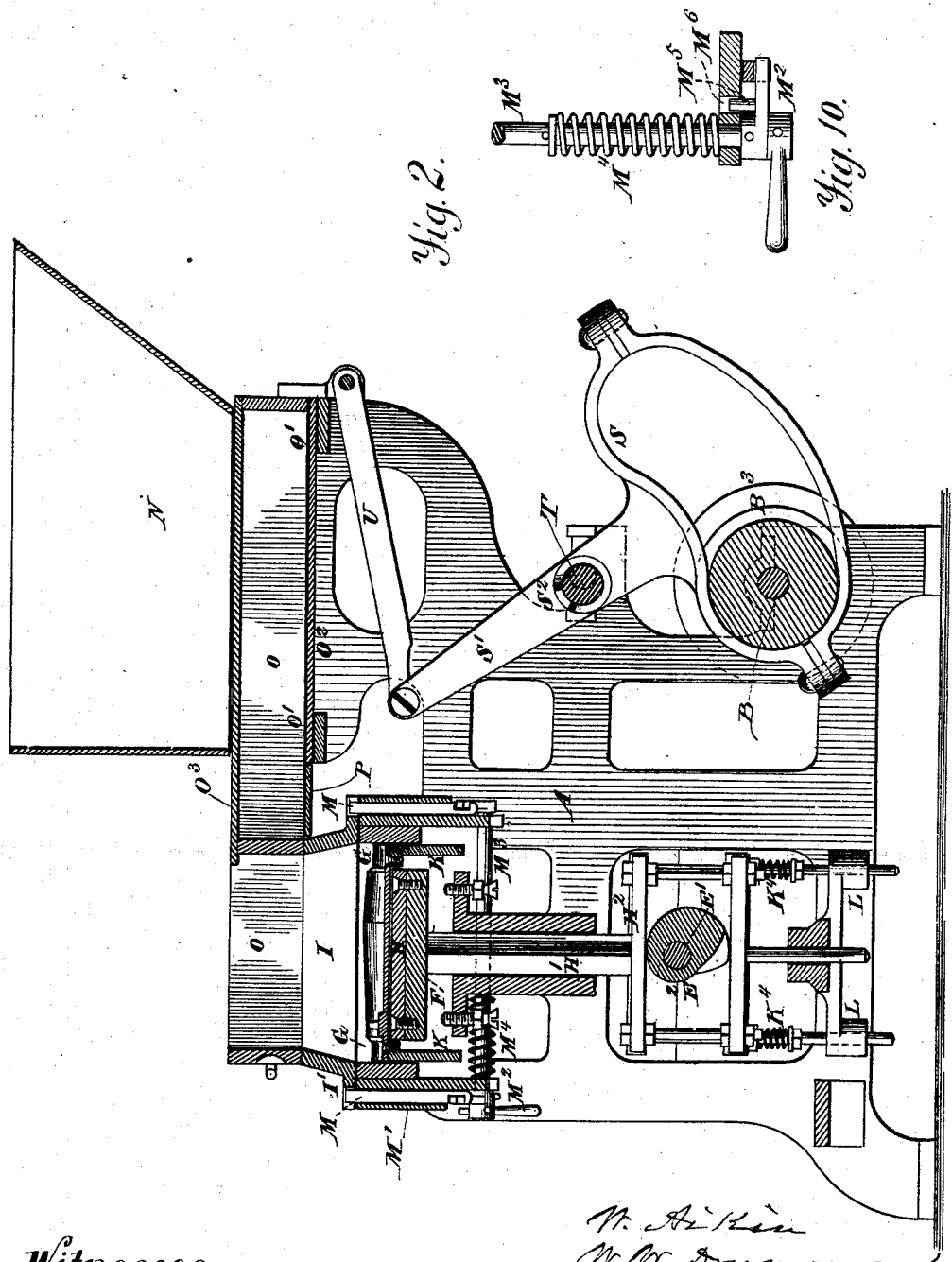

W. AIKIN & W. W. DRUMMOND.
Machine for Molding in Sand.

No. 224,570. Patented Feb. 17, 1880.

Witnesses.
A. Ruppert,
J. G. Mason

Inventors.
W. Aikin
W. W. Drummond
D. P. Holloway & Co.
Atty

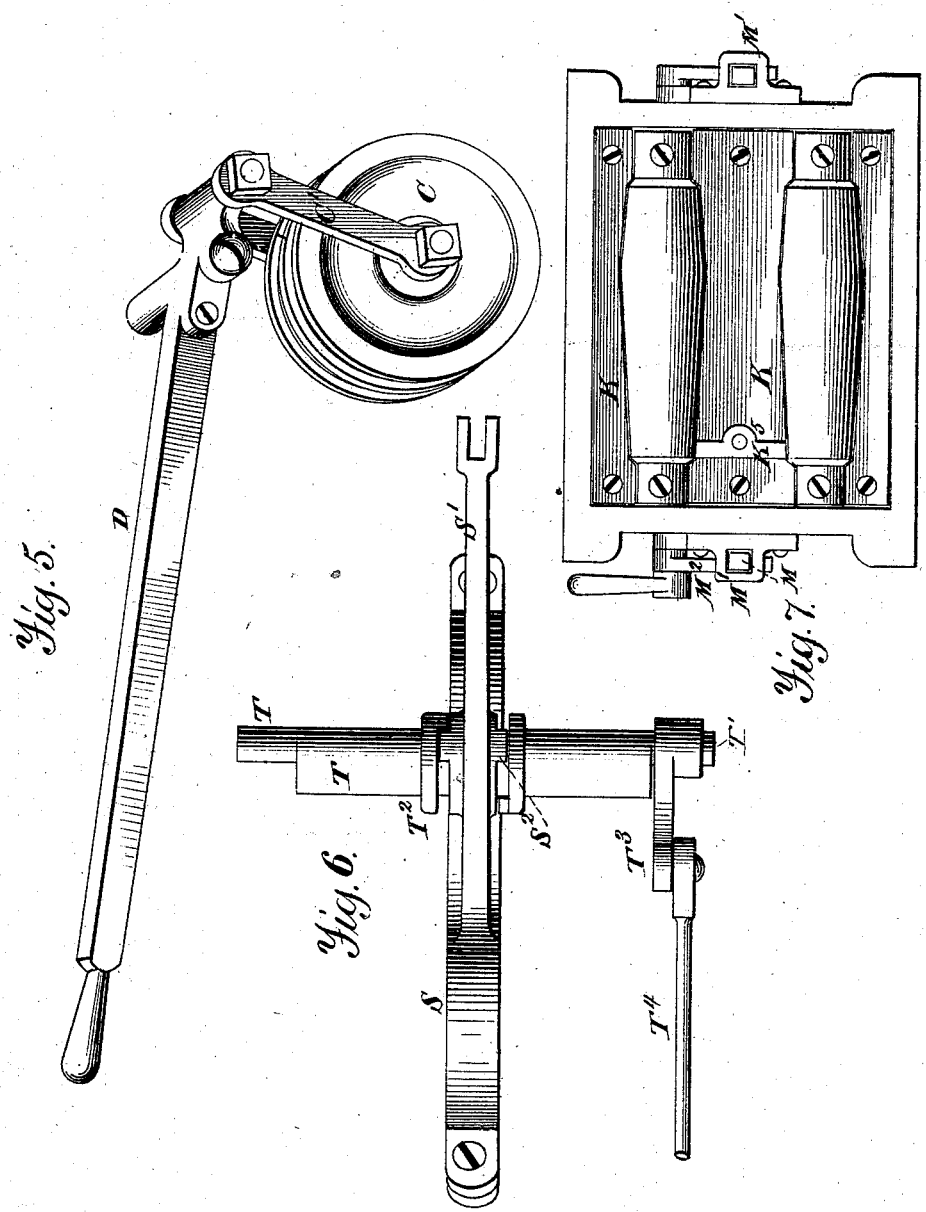

UNITED STATES PATENT OFFICE.

WILLIAM AIKIN AND WILLIAM W. DRUMMOND, OF LOUISVILLE, KY.

MACHINE FOR MOLDING IN SAND.

SPECIFICATION forming part of Letters Patent No. 224,570, dated February 17, 1880.

Application filed January 28, 1879.

*To all whom it may concern:*

Be it known that we, WILLIAM AIKIN and WILLIAM W. DRUMMOND, of Louisville, in the county of Jefferson and State of Kentucky, have invented certain new and useful Improvements in Machines for Molding in Sand, of which the following is a specification.

This invention relates to improvements made in the machines heretofore invented by us, made the subject of divers Letters Patent.

Our improvements consist, first, in the use of a removable head, to which the patterns are attached, instead of attaching them directly to the plunger-head; second, the manner of operating the guide-pins and sockets by which the half-flask is attached to the sand-box; third, the using of a hinged bridge for the sand-box, instead of the sliding bottom shown in our Patent No. 195,784; fourth, the devices for operating the sand-drawer; fifth, spring attachments to the cam-frames; sixth, in the catch for the binding-bar; seventh, in the driving mechanism.

For a more full description of the machine to which this is applied reference is made to Letters Patent Nos. 195,070, 195,071, 195,784, 195,785, 195,786, 201,377, and 202,322.

Our improvements are illustrated as applied to a single-acting machine.

Figure 8:
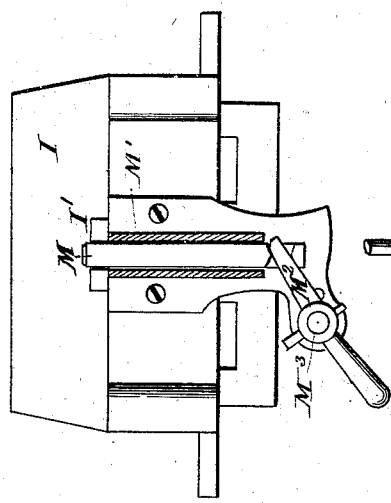
Figure 9:
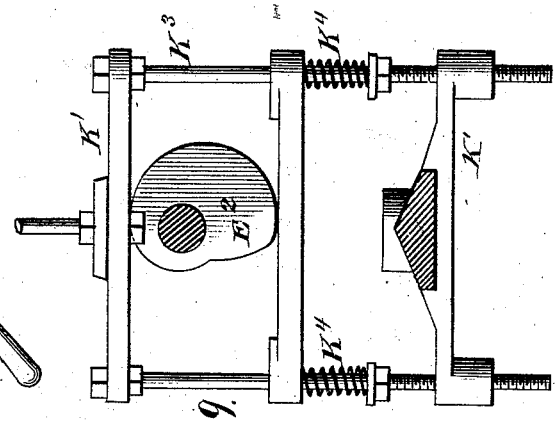
Figure 3:
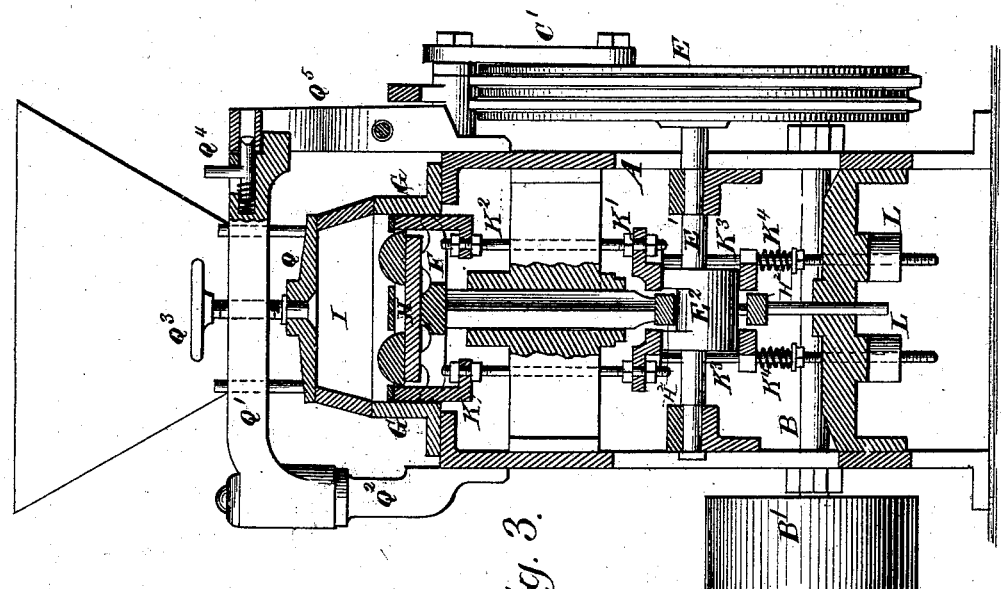

In the annexed drawings, making a part of this specification, Figure 1 is a side elevation. Fig. 2 is a longitudinal central vertical section. Fig. 3 is a transverse central vertical section. Fig. 4 is a perspective view of the pattern-plate which is attached to the plunger-head. Fig. 5 is a perspective view of the lever which operates the driver of the sand-drawer. Fig. 6 is a plan view, showing the shaft and some of the connected mechanism for operating the sand-drawer. Fig. 7 is a plan view of the sand-box. Fig. 8 is an elevation, showing the attachment connecting the sand-box and half-flask. Fig. 9 is an elevation, showing the sash-frame and attachments. Fig. 10 is a plan view, partly in section, showing the lever used in locking and unlocking the cope and drag.

The same letters are employed in all the figures in the indication of identical parts.

A is a frame, of cast-iron, formed to support the mechanism. B is a driving-shaft operated by a pulley, B', communicating motion to the friction-wheel $B^2$. C is an idle-wheel swung upon links C', connected to the short arm of the lever D, which has its fulcrum formed by a stud-pin on the side of the frame A. By raising the lever D the idle-wheel C is brought into engagement with the friction-wheel $B^2$ and the driver E, which is hung on the end of the shaft E' and carries the cam $E^2$, which operates the plunger-head F, which moves in the sand-box G and carries the pattern-plate H, to which the patterns are attached.

Power being communicated from the driver to the plunger through the frictional contact regulated by hand-pressure, the mechanism is not liable to be broken in case of undue resistance.

The pattern-plates form a head for the plunger. By making the head of the plunger removable it can be made as a card to support a set of patterns, which may thus very readily be changed.

The word "card" is used above in its familiar sense among molders as representing a number of patterns connected by arms, so that the mold and gates are made at once from the pattern.

The plunger H', which carries the pattern-head H, is attached to a yoke, $H^2$, encircling the cam $E^2$, and is operated by the cam.

K is the follower-head, made in sections, and actuated by the yokes K', which embrace the cam $E^2$, and are operated by its revolution, the cam being so formed as to give a slight upward movement to follower-plates K before the pattern-head is raised. The object of this is to give a slight preliminary compression to that part of the sand which is outside of the pattern, and this in order that the sand in the flask may be uniformly compressed, which would not be the case if the pattern-heads and follower-heads moved simultaneously and to the same extent, because in the latter case, as the patterns are driven farther into the sand, the sand above the patterns would be more compressed than that portion which is at one side of the line of movement of the patterns. So, also, in order that the pattern may be withdrawn without breaking away particles of sand adhering at the angle formed by the follower-head and pattern, the cam is so formed as to withdraw the pattern-heads slightly before the sections of the follower-heads are withdrawn from the surface of the sand in the flask. By this means the surface of the sand in the flask is supported by the follower-head until the pattern is withdrawn from contact with the sand.

The sides of the yoke K' are formed by rods K³, which pass through guides L, formed in a cross-brace of the frame, and are fitted with spiral springs K⁴, bearing against adjustable nuts secured onto a thread cut on the rods, so that by raising or lowering the nuts the tension of the springs K⁴ may be regulated, determining the resistance of the lower section of the yoke to the action of the spring.

The cam E² may be made to operate both pattern-head and follower simultaneously, as in some work this is more desirable than to have it operate first the follower-plate and then the pattern-head.

I is a half-flask, in which a part of the mold is intended to be formed. It is constructed with notched lugs I', which are intended to receive sliding pins M, which move vertically in guides M', and are actuated by the point M² of a lever pivoted to a shaft, M³, having its bearings on the main frame, and surrounded by a spiral spring, M⁴, which is intended to hold the catch-pin M⁵, placed on the inner side of the lever, which enters holes M⁶ on the frame, so that when the arm M is thrown up or down it shall be held in that position, and can only be released by drawing the lever out and thus disengaging the pins from the holes.

The pins are made so that they may be removed, if desired, and when this is done the upper part of the flask or cope is held in place by means of lugs entering the sockets on the drag or lower part of the flask.

When the flask is placed on the sand-box it is secured in position by projecting the pin M into slot I'. It is then filled with sand from the sand-hopper N, which is mounted on the main frame A and is stationary. It is mounted on supports, leaving space under it for the sliding sand-drawer O, which is open at the bottom, as shown at O', but rests on a plate, O², extending from the front to the back of the hopper, the portion of the bottom outside of the hopper and between it and the edge of the flask being formed by the hinged extension P. When the sand-drawer is drawn back to the position shown in Fig. 1, sand from the hopper will flow into the drawer and fill that part of it where there is no cover. When the covered portion, (shown at O³, Fig. 1,) which is about two-thirds of the entire length of the drawer, comes under the hopper, it serves as a cut-off and supports the sand.

When the half-flask is filled with sand the binder-plate Q is swung into position on top of the flask. The binder-plate is suspended from the arm Q', which swings on the standard Q² by means of the screw Q³.

A spring-catch, Q⁴, in the end of the swinging arm Q' is made to engage a notch or hole in the standard Q⁵, which holds the binder-plate firmly in position when swung over the half-flask, the bar Q' sustaining the pressure caused by the upward movement of the plunger against the sand in the sand-box and half-flask, the capacity of the sand-box G and flask being such that when the patterns are set they will hold just the quantity of sand necessary to supply the reduction by compression after the mold is formed, which quantity is furnished it by the sand-drawer O.

Before the box is filled the sprue or gate stick R is placed on the follow-board K, which has a raised part, K⁵, Fig. 7, which forms the branches of the gate leading from the sprue to the pattern. There is a hole formed in the binder-plate, through which the sprue or gate stick passes as the sand is compressed by the raising of the plungers. The stick is then removed and the half-flask is finished. In filling the lower section of the flask, of course, no sprue-stick is used.

The following is the mechanism devised for operating the sand-drawer: B³ is a pulley on the driving-shaft B. S is a yoke, formed as shown, embracing the pulley B³. This yoke carries an arm, S', through which passes the eccentric shaft T, the journals of which, T', are eccentric, as clearly shown in Fig. 6. The shaft and arm S' are coupled by means of a clutch-collar, T², fastened to the shaft T by a set-screw, which permits its adjustment, and engaging a point on the hub where S' receives the shaft, as shown at S² in Fig. 6. The object of this engagement is to give to the arm a certain amount of play on the shaft T, sufficient to permit the throw of the free end of the arm S' when the shaft is stationary.

The shaft T receives a partial revolution by means of an arm, T³, to which is fastened the horizontal adjusting-rod T⁴.

By moving the rod T⁴ the yoke S may be raised or lowered so as to bring it into frictional contact with the surface of the constantly-rotating pulley B³. Instead of producing this motion by frictional contact, B³ may be a spur-pinion, and corresponding teeth formed on the edge of the slot in yoke S.

The operator, by pushing the rod into the position shown in Fig. 1, brings the lower side of the yoke into contact with the under side of the pulley B³ and causes the yoke to move into the position shown in Fig. 2. The arm S', through the connecting-rod U, which is pivoted to the upper end of the arm S' and outer end of the sliding drawer O, draws the drawer forward, carrying the sand from the hopper and dropping it into the flask and sand-box. The operator then draws the rod out, so as to reverse the arm T³, shifting the eccentric-shaft T and depressing the yoke S, so that its upper surface shall bear on the top of the pulley B³, thereby causing the oscillation of the arm S', drawing the sand-drawer O back into the position shown in Fig. 1, when it again receives its charge of sand.

What we claim as our invention, and desire to secure by Letters Patent, is—

1. The removable head H, to which the patterns are attached, in combination with the reciprocating plunger of a machine for molding in sand, substantially as set forth.

2. In combination with the half-flask I, furnished with lugs I', the reciprocating pin M, for engaging the lug and holding the flask in place, the guideways for the pins, and lever for oscillating them, substantially as set forth.

3. In combination with the flask and sliding sand-drawer, the hinged apron P, for supporting the sand while being conveyed from the hopper to the sand-box, substantially as set forth.

4. In combination with the sliding sand-drawer, the adjustable eccentric-shaft T, connecting-rod U, oscillating arm S', slotted yoke S, and pulley or wheel $B^3$, substantially as set forth.

5. In combination with the cam $E^2$, the yoke K', rods $K^3$, and adjustable spiral springs $K^4$, substantially as set forth.

6. In combination with the binder-plate Q, swinging arm Q', and standards $Q^2$ $Q^5$, the spring-catch $Q^4$, substantially as set forth.

7. In a machine for molding in sand, in combination with the plunger which carries the pattern and driver, an intermediate idle-wheel bearing, by adjustable pressure, on the driver and driven pinion, to move the plunger by friction with a regulated force, substantially as set forth.

WILLIAM AIKIN.
WILLIAM WHYTE DRUMMOND.

Witnesses:
   W. T. DRUMMOND,
   J. J. MCDONALD.